United States Patent
Schaake

(10) Patent No.: US 7,329,105 B2
(45) Date of Patent: Feb. 12, 2008

(54) MULTI-DIRECTIONAL PUMP

(75) Inventor: Mark D. Schaake, Bonner Springs, KS (US)

(73) Assignee: Haldex Brake Corporation, Kansas City, MO (US)

( * ) Notice: Subject to any disclaimer, the term of this patent is extended or adjusted under 35 U.S.C. 154(b) by 551 days.

(21) Appl. No.: 10/727,271

(22) Filed: Dec. 3, 2003

(65) Prior Publication Data

US 2005/0123426 A1 Jun. 9, 2005

(51) Int. Cl.
*F04B 39/10* (2006.01)
*F04B 53/10* (2006.01)
*F04B 3/00* (2006.01)
*F04B 5/00* (2006.01)
*F04B 25/00* (2006.01)
*F04B 23/04* (2006.01)
*F04B 41/06* (2006.01)

(52) U.S. Cl. ............ 417/534; 417/244; 417/248; 417/251; 417/252; 417/521

(58) Field of Classification Search ........ 417/244, 417/254, 521, 534, 248, 250, 251
See application file for complete search history.

(56) References Cited

U.S. PATENT DOCUMENTS

| | | | |
|---|---|---|---|
| 1,517,898 A * | 12/1924 | Fiedler | 417/435 |
| 1,579,321 A | 4/1926 | Johnson | |
| 2,155,384 A | 4/1939 | Carr | |
| 2,246,932 A * | 6/1941 | Collins | 417/62 |
| 3,653,789 A * | 4/1972 | Maroth | 417/534 |
| 3,823,573 A | 7/1974 | Cassady | 62/238 |
| 4,008,003 A * | 2/1977 | Pinkerton | 417/250 |
| 4,111,609 A * | 9/1978 | Braun | 417/243 |
| 4,627,795 A | 12/1986 | Schmitz-Montz | 417/267 |
| 4,657,488 A | 4/1987 | Weinhandl | 417/267 |
| 4,700,680 A * | 10/1987 | Pearce | 123/383 |
| 4,776,776 A | 10/1988 | Jones | 417/560 |
| 4,830,581 A * | 5/1989 | Hendriks | 417/252 |
| 4,889,039 A | 12/1989 | Miller | 92/140 |

(Continued)

FOREIGN PATENT DOCUMENTS

DE 1 910 848 9/1970

OTHER PUBLICATIONS

European Search Report (European Patent Office, 2 pages, Apr. 8, 2005).

*Primary Examiner*—Anthony D. Stashick
*Assistant Examiner*—Patrick Hamo
(74) *Attorney, Agent, or Firm*—St. Onge Steward Johnston & Reens LLC

(57) ABSTRACT

A multi-directional pump is disclosed generally comprising a housing with inlet and outlet ports, a pumping device disposed therein, a first chamber in fluid communication with the inlet port, and a second chamber in fluid communication with the first chamber. The first and second chambers are both in direct fluid communication with the outlet port, such that a double pumping effect is achieved while some of the fluid is compressed in multiple stages. In certain embodiments, one or more sealing mechanisms can be activated when particular conditions are desired in order to seal the first conduit by which the first and second fluid chambers communicate, or by which the second fluid chamber communicates with the inlet port, such that a standard double or single pumping effect is achieved.

26 Claims, 5 Drawing Sheets

U.S. PATENT DOCUMENTS

| | | |
|---|---|---|
| 4,931,000 A | 6/1990 | Fleming, Jr. ................ 417/534 |
| 5,493,953 A * | 2/1996 | Bolthouse et al. ........ 92/165 R |
| 6,071,085 A * | 6/2000 | Bernhardt ................... 417/251 |
| 6,071,088 A * | 6/2000 | Bishop et al. .............. 417/322 |
| 6,072,088 A * | 6/2000 | Van Der Puy .............. 568/685 |
| 6,363,893 B1 * | 4/2002 | Xin et al. ............. 123/41.82 R |
| 6,817,838 B2 * | 11/2004 | Mori .......................... 417/244 |
| 2001/0029922 A1 | 10/2001 | Dow ........................ 123/197.1 |
| 2002/0141884 A1 * | 10/2002 | Sperry ........................ 417/306 |

* cited by examiner

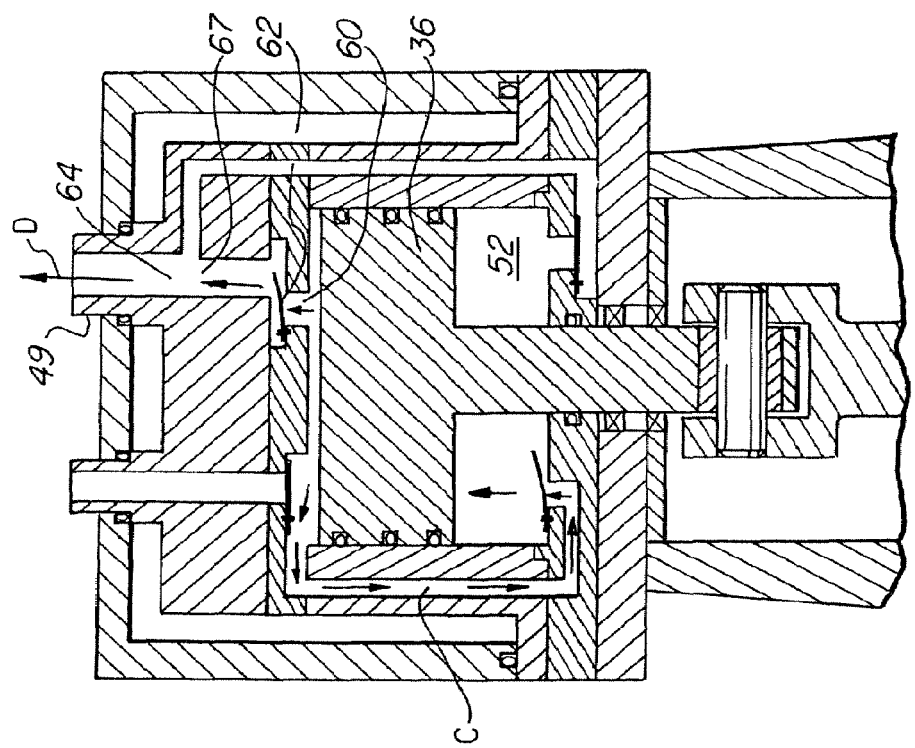
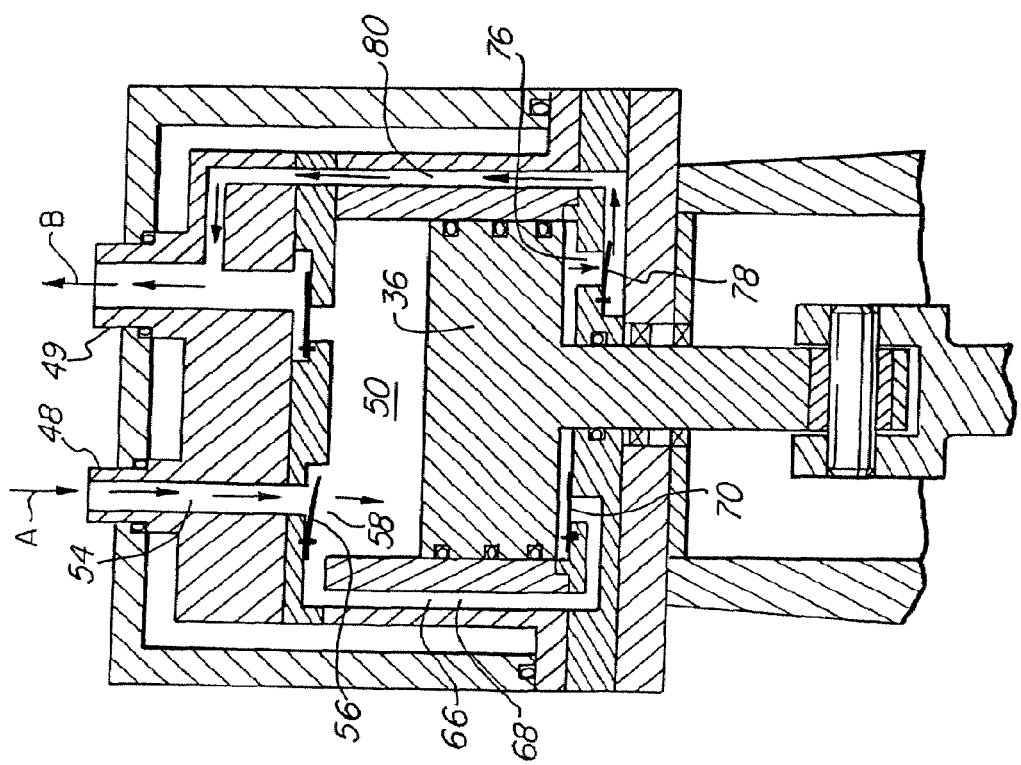

MULTI-DIRECTIONAL PUMP

FIELD OF THE INVENTION

The present invention relates to apparatus for generating compressed fluid. More specifically, the invention relates to a pump that compresses fluid when a pumping device moves in multiple directions.

BACKGROUND OF THE INVENTION

As is well known, various parts of certain vehicles require the use of compressed fluid, such as compressed air, for their operation. For example, the brake systems of trucks and other large vehicles often use compressed air to bias various braking mechanisms, such as spring-based actuators, into braking and non-braking positions.

Various types of pumps have been developed for generating this compressed fluid, including diaphragm-based air pumps, multi-piston, swash plate compressors, and single, shaft-driven piston compressors. Of course, because space and power are always of concern when designing vehicles, different types of designs and improvements have been suggested to maximize the concentration of compressed fluid discharged by the pump while minimizing the size of the pump.

One such suggestion is the design of a two-stage pump, such as the two-stage piston compressor disclosed in U.S. Pat. No. 4,657,488 to Weinhandl. In this type of compressor, an inlet is provided for allowing air to enter into a first compression area, located at one end of the upper portion of a piston. This first compression area is connected to a second, smaller compression area located on the opposite side of the upper portion of the piston, which, in turn, is connected to an outlet. Accordingly, on the piston's downstroke, air enters the first area through the inlet. On the piston's upstroke, the air is compressed and pushed into the second, smaller compression area, where, on the piston's next downstroke, it is then compressed again and discharged out the outlet. In this way, a higher concentration of compressed air is output by the compressor.

One disadvantage, however, with this sort of two-stage compression is that it results in more heat, which leads to numerous problems. For example, often, an air dryer is used in conjunction with the compressor to remove moisture in the air being supplied by the compressor before it is supplied to the relevant parts of the vehicle. Because the air is hotter it, is able to hold more water vapor, and therefore, the air dryer must work harder to remove the moisture. Another problem created by this additional heat is that it causes oil to be more prone to "coking up"—burning and leaving behind carbon deposits. Yet another problem caused by excessive amounts of very hot air is that components of the compressor, and downstream from the compressor, will tend to have a shorter life, in part because of contraction and expansion of those parts from unnecesary levels of heating and cooling.

Another disadvantage with this sort of two-stage compression is that a certain degree of "pounding" still occurs. The air dryers commonly used in conjunction with these compressors typically contain a desiccant for removing the moisture. Being repeatedly subjected to the intermittent force of the compressed air on each piston upstroke can eventually turn the desiccant into powder.

What is desired, therefore, is a method and apparatus for compressing fluid that provides for increased concentration of compressed fluid, but does not result in excessive heat. What is further desired is a method and apparatus that provides for increased concentration of compressed fluid, but does not result in pounding.

SUMMARY OF THE INVENTION

Accordingly, it is an object of the present invention to provide a pump that supplies high concentrations of compressed fluid.

It is a further object of the present invention to provide a pump that lowers the temperature of the compressed fluid.

It is yet another object of the present invention to provide a pump that provides a continuous flow of compressed fluid.

In order to overcome the deficiencies of the prior art and to achieve at least some of the objects and advantages listed, the invention comprises a multi-directional pump, including a housing having an inlet port and an outlet port, a pumping device disposed in the housing, a first fluid chamber in fluid communication with the inlet port for receiving fluid when the pumping device is moved toward a first position, a second fluid chamber in direct fluid communication with the outlet port, a first conduit by which fluid in the first fluid chamber is communicable to the second fluid chamber when the pumping device is moved toward a second position, and a second conduit by which fluid in the first fluid chamber is directly communicable to the outlet port.

In another embodiment, the invention comprises a pump including a housing having an inlet port and an outlet port, a pumping device disposed in the housing, a first fluid chamber in fluid communication with the inlet port for receiving fluid when the pumping device is moved toward a first position, a second fluid chamber, a conduit by which fluid in the first fluid chamber is communicable to the second fluid chamber when the pumping device is moved toward a second position, and wherein the first and second fluid chambers are in direct fluid communication with the outlet port.

In another embodiment, the invention comprises a method of compressing fluid with a pump having an outlet, the method including the steps of urging fluid into the pump, compressing the fluid in a first compression area, urging a first volume of the compressed fluid through the outlet and a second volume of the compressed fluid to a second compression area, further compressing the second volume of the compressed fluid, urging the further compressed fluid through the outlet.

BRIEF DESCRIPTION OF THE DRAWINGS

FIG. 2a is a cross-sectional side view of one embodiment of the pump of FIG. 1 when the piston is moved to a first position.

FIG. 2b is a cross-sectional side view of the pump of FIG. 2a when the piston is moved to a second position.

DETAILED DESCRIPTION OF THE DRAWINGS

Figure 1:
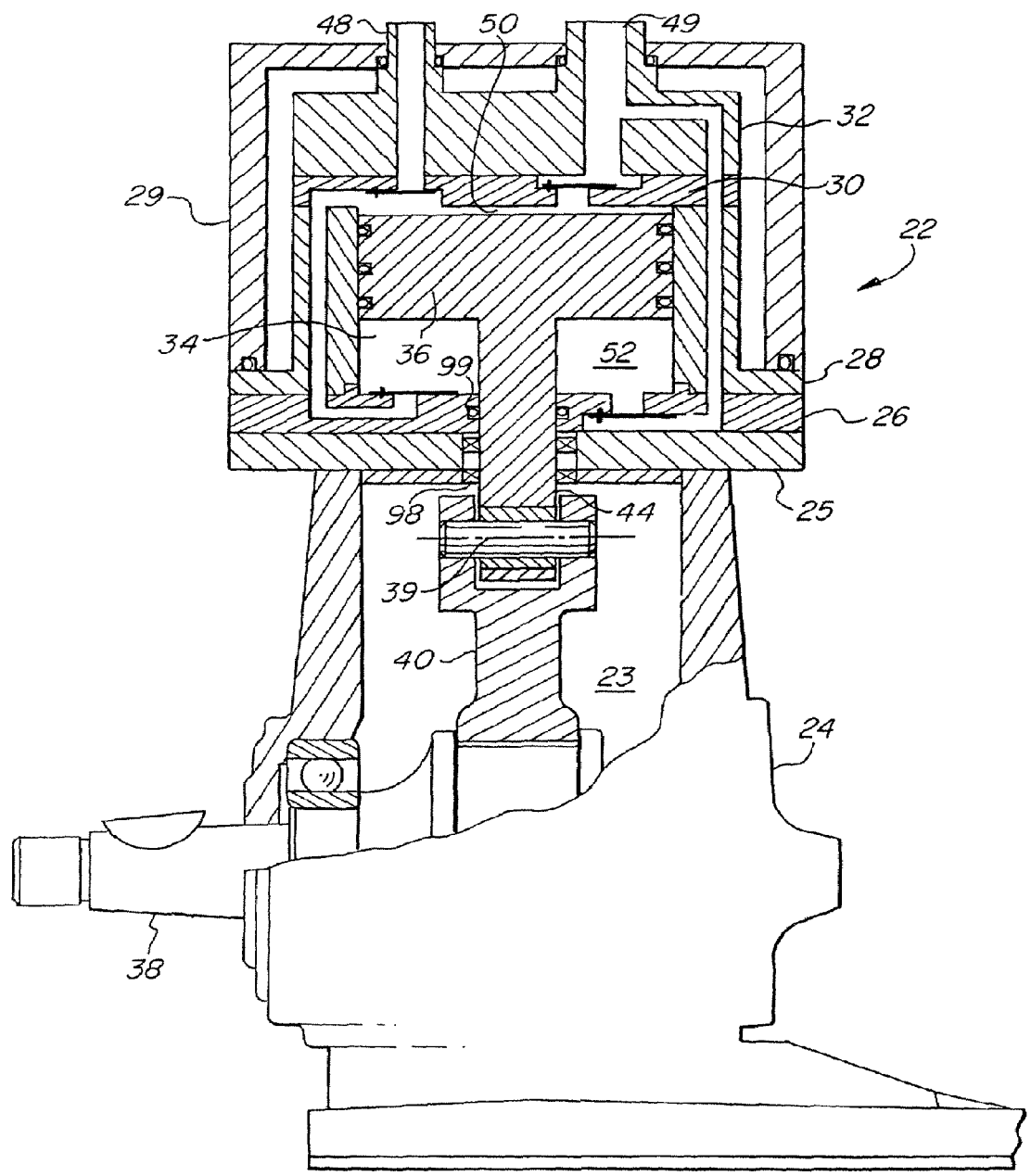
FIG. 1 is a cross-sectional side view of a multi-directional pump in accordance with the invention.

The basic components of one embodiment of a multi-directional pump in accordance with the invention are illustrated in FIG. 1. As used in the description, the terms "top," "bottom," "above," "below," "over," "under," "on top," "underneath," "up," "down," "upper," "lower," "front," "rear," "forward" and "back" refer to the objects referenced when in the orientation illustrated in the drawings, which orientation is not necessary for achieving the objects of the invention.

As illustrated in FIG. 1, a housing 22 contains a pumping device 36. A first fluid chamber 50 is located at one end of the pumping device 36, while a second fluid chamber 52 is located at the opposite end of the pumping device 36. Accordingly, the first and second fluid chambers 50, 52 may alternately receive fluid as the pumping device 36 is moved between first and second positions, as illustrated in FIGS. 2a-2b, respectively.

In the embodiment depicted in FIG. 1, the housing 22 is a compressor housing, which may include several parts mounted adjacent each other, including a drive shaft housing 24, a seal plate 25, a lower valve plate 26, a cylinder 28, an upper valve plate 30, and a head 32. The cylinder 28 has a piston channel 34 therein, in which a piston 36 is slidably disposed. The drive shaft housing 24 houses one end of a drive shaft 38, to which a connecting rod 40 is attached. The connecting rod 40 may be annularly fitted over the drive shaft 38, attached to the end surface thereof, or otherwise affixed to the drive shaft 38 in a manner such that the connecting rod 40 moves up and down as the drive shaft 38 rotates. The connecting rod 40 is attached to the stem 44 of the piston 36 by a wrist pin 39, such that, as the drive shaft 38 rotates, the piston head 46 reciprocates up and down in the piston channel 34. The head 32 has at least one inlet port 48 and at least one outlet port 49 in order to receive and discharge fluid in accordance with the movement of the piston 36, as is further explained below.

As shown in FIG. 2a, the first fluid chamber 50 is in fluid communication with the inlet port 48, such that, when the piston 36 is moved down into a first position, fluid is drawn through the inlet port 48, through a channel 54, past a valve 56 (such as, for example, a reed valve), through a passage 58, and into the first fluid chamber 50 (indicated by arrows A). As shown in FIG. 2b, the first fluid chamber 50 is also in fluid communication with the outlet port 49, such that, when the piston 36 is moved up into a second position, fluid is discharged from the first fluid chamber 50, through the outlet 60, past a valve 62 (such as, for example, a reed valve), through a channel 64, and out through the outlet port 49 (indicated by arrows D).

A first conduit 66 connects the first fluid chamber 50 with the second fluid chamber 52 such that, when the piston 36 is moved up into the second position, fluid may be transferred from the first fluid chamber 50 to the second fluid chamber 52 (indicated by arrows C). In this embodiment, the first conduit 66 includes the passage 58, channel 68, and inlet 70. In other embodiments, however, the first conduit 66 may comprise any individual or sequence of passages and/or channels appropriate to transfer fluid from the first fluid chamber 50 to the second fluid chamber 52 as the pumping device 36 is moved to a second position.

As shown in FIG. 2b, a second conduit 67 connects the first fluid chamber 50 to the outlet port 49 such that, when the piston 36 is moved up into the second position, fluid may be transferred from the first fluid chamber 50 to the outlet port 49 (indicated by arrows D). In this embodiment, the second conduit 67 includes the outlet 60 and channel 64. In other embodiments, however, the second conduit 67 may comprise any individual or sequence of passages and/or channels appropriate to transfer fluid from the first fluid chamber 50 to the outlet port 49 as the pumping device is moved to the second position.

Like the first fluid chamber 50, the second fluid chamber 52 is also in fluid communication with the outlet port 49. Accordingly, as shown in FIG. 2a, when the piston 36 is moved down into the first position, drawing fluid into the first fluid chamber 50 (indicated by arrows A), fluid in the second fluid chamber 52 is simultaneously discharged through the outlet 76, past the valve 78, through the channel 80, and out the outlet port 49 (indicated by arrows B). As shown in FIG. 2b, when the piston 36 is subsequently moved up into the second position again, some of the fluid in the first fluid chamber 50 is discharged through the second conduit 67, as described above, while some of the fluid in the first fluid chamber 50 is drawn through the first conduit 66 and into the second fluid chamber 52, where it is compressed a second time when the piston 36 again returns to the first position shown in FIG. 2a.

Because fluid in the first fluid chamber 50 exits therefrom via both the passage 58 and the outlet 60 (as shown in FIG. 2b), the amount of air drawn through the first conduit 66 into the second fluid chamber 52 is inversely proportional to the air being discharged from the outlet 60 through the outlet port 49. The second fluid chamber 52 is of a smaller volume than the first fluid chamber 50, such that the fluid transferred from the first fluid chamber 50 to the second fluid chamber 52, which has already been compressed in the first fluid chamber 50, can be further compressed in the second fluid chamber 52. Additionally, the second fluid chamber 52 is sized sufficiently smaller than the first fluid chamber 50 to ensure that enough pressure is present to allow this further compression while accounting for the fact that some fluid has exited the first fluid chamber 50 via the outlet 60. The creation of a second fluid chamber 52 smaller than the first fluid chamber 50 can be achieved in any one of various ways, such as, for example, by defining the second fluid chamber 52 not only by an outer radius (such as the piston channel 34), but by an inner radius as well (such as the piston stem 44).

Because the first and second fluid chambers 50, 52 are both in direct fluid communication with the outlet port (i.e., fluid can be communicated from each chamber to the outlet port without having to pass through the other chamber), fluid is discharged through the outlet port 49 both on the upstroke and the downstroke of the piston 36, thereby providing the reduced pounding effect of a double acting pump. Moreover, the fluid supplied by the second fluid chamber 52 has been compressed twice, providing more concentrated fluid. The discharge of this twice-compressed fluid through the outlet port 49, however, is being alternated with fluid supplied by the first fluid chamber 50, which has only been compressed once, thereby resulting in a reduction of heat.

Figure 3B:
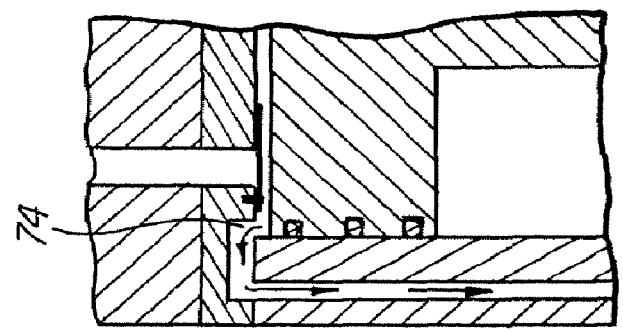
FIG. 3b is a cut-away, cross-sectional side view of the pump of FIG. 3a when the piston is moved to a second position.
Figure 3A:
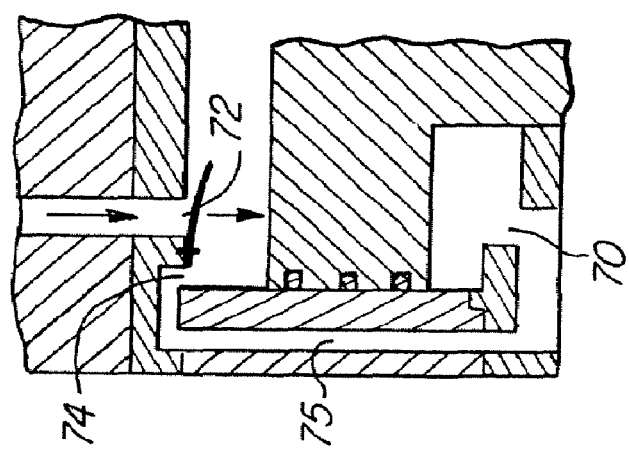
FIG. 3a is a cut-away, cross-sectional side view of another embodiment of the pump of FIG. 1 when the piston is moved to a first position.

Though, in the embodiments depicted in FIGS. 2a-2b, the passage 58 permits fluid to flow both into and out of the first fluid chamber 50, in certain embodiments, a separate inlet 72 and outlet 74 may be provided in lieu of passage 58, as shown in FIGS. 3a-3b. In these embodiments, the first conduit 66 includes the outlet 74, channel 75, and inlet 70.

Because conditions may vary and thus, different levels of compressed air may be required, one may wish to increase or decrease the concentration of compressed fluid discharged from the pump. Accordingly, in these embodiments, the above described design may be used to create a straight double acting pump, or even a single-acting pump, by employing one or more sealing mechanisms to restrict the flow of fluid by sealing the first conduit 66 by which the first and second fluid chambers 50, 52 communicate, as is further described below.

Figure 5:
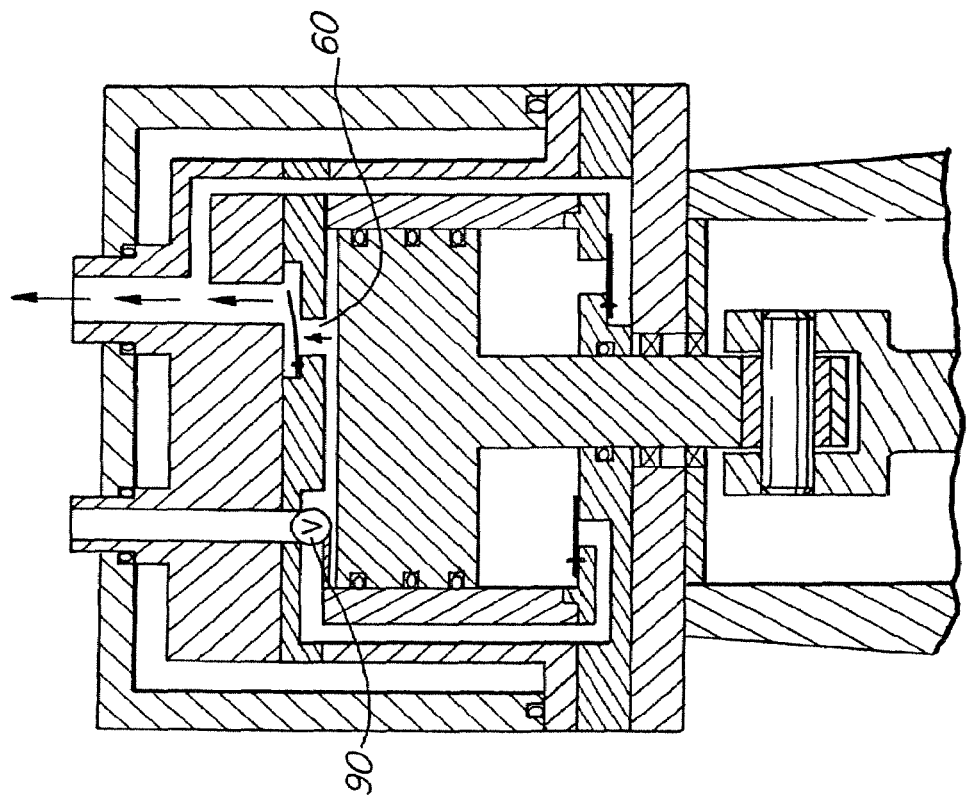
FIG. 5 is a cross-sectional side view of an embodiment of the pump of FIG. 2b employing a directional-control valve, wherein the valve is set to restrict fluid communication between the inlet port and second fluid chamber.
Figure 4:
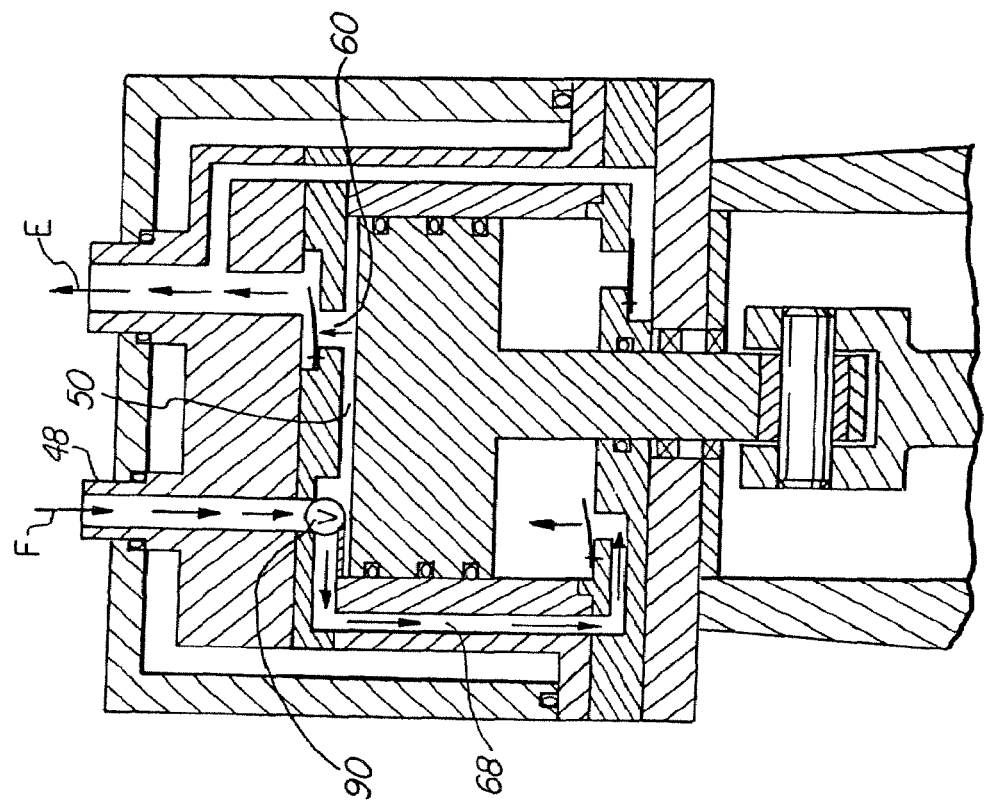
FIG. 4 is a cross-sectional side view of an embodiment of the pump of FIG. 2b employing a directional-control valve, wherein the valve is set to permit fluid communication between the inlet port and second fluid chamber.

For example, this may be desired with certain buses or over-the-road trucks that are sometimes used to travel long distances and are other times used to start and stop repeatedly over the course of a relatively short distance. In such cases, different amounts of compressed air will be required at different times by the same vehicle. Accordingly, as illustrated in FIGS. 4-5, in certain advantageous embodiments, the pump may include a controllable sealing mechanism 90. When it is desired to decrease the concentration of fluid discharged by the pump, the sealing mechansim 90, which may, for example, comprise a directional-control valve, can be set to restrict the flow between the first fluid chamber 50 and the channel 68, as shown in FIG. 4. Accordingly, when the piston 36 moves from the first position to the second position, the fluid in the first fluid chamber 50 will be forced out only through the outlet 60 (indicated by arrows E), and fluid will be drawn into the second fluid chamber 52 directly from the inlet port (indicated by arrows F). Accordingly, a double-acting pump is effectively created. Alternatively, as shown in FIG. 5, the sealing mechanism 90 may be set to restrict the flow of fluid to the channel 68 from both the inlet port 48 and the first fluid chamber 50, cutting off the second fluid chamber 52 entirely and thereby effectively creating a single-acting pump.

Figure 7:
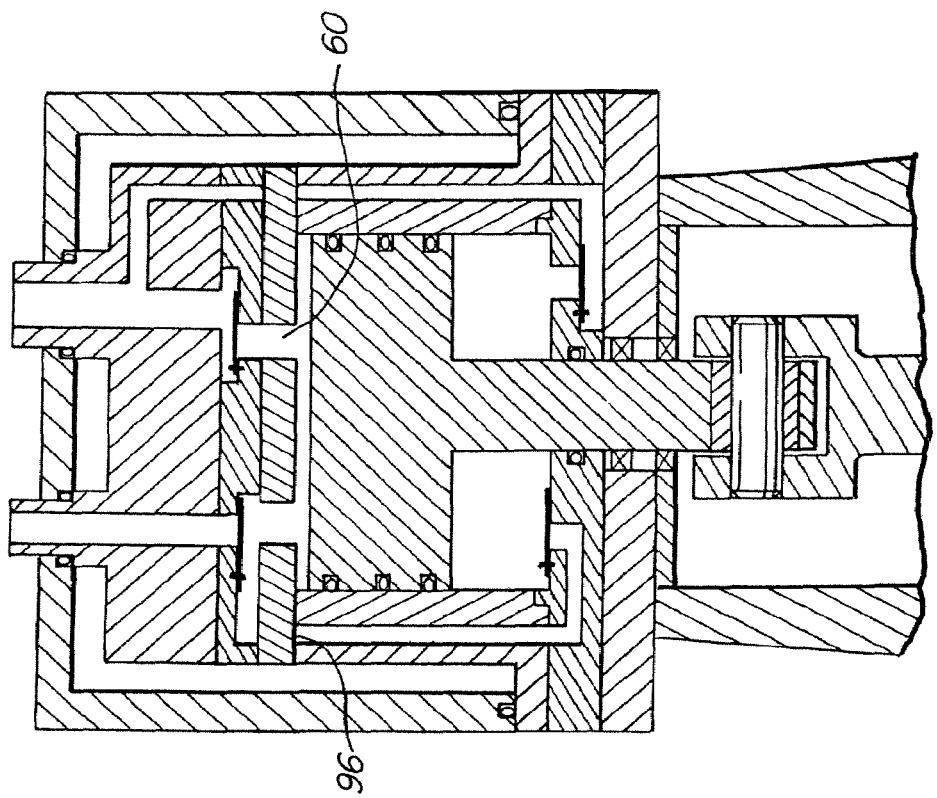
FIG. 7 is a cross-sectional side view of an embodiment of the pump of FIG. 2b employing adapted to restrict fluid communication between the inlet port and second fluid chamber.
Figure 6:
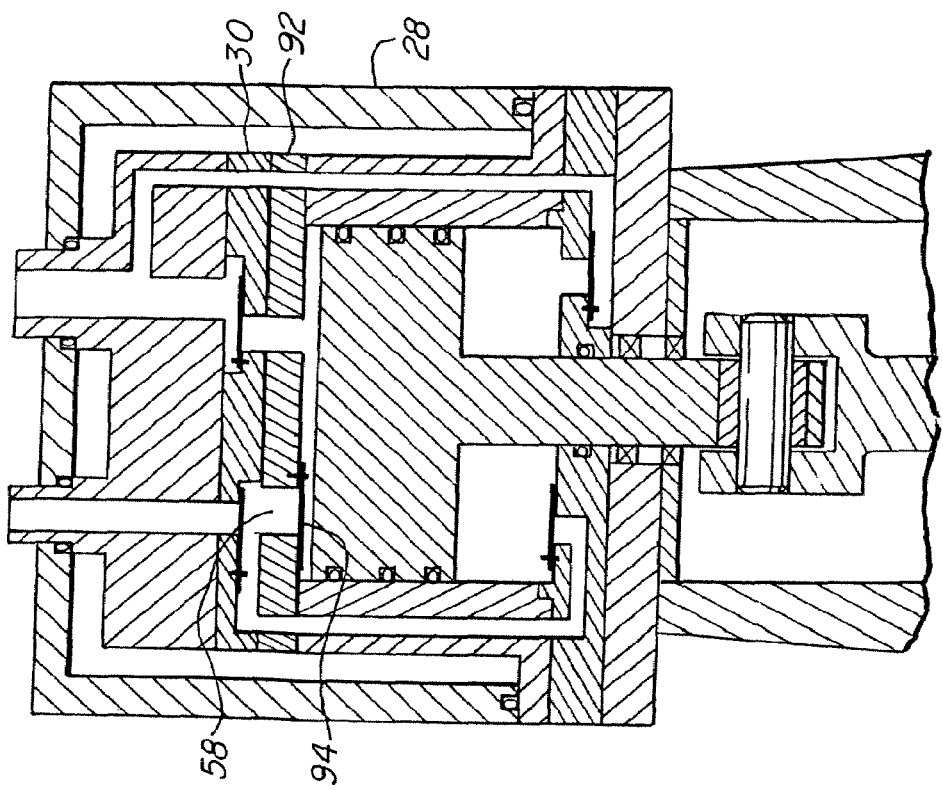
FIG. 6 is a cross-sectional side view of an embodiment of the pump of FIG. 2b employing a plate adapted to restrict fluid communication between the inlet port and second fluid chamber.

In some embodiments, it may be known that a straight double-acting, single-acting, or two-stage pump is desired. As illustrated in FIGS. 6-7, in these embodiments, the sealing mechanism may simply comprise a plate 92 mounted between the cylinder 28 and the upper valve plate 30. This plate may include any arrangement of apertures, valves, or wall sections appropriate for the particular flow paths desired.

For example, as illustrated in FIG. 6, the plate 92 may simply add a one way valve 94, such as a reed valve, permitting fluid to flow into the first fluid chamber 50 via the passage 58, but not out of the first fluid chamber 50 via the passage 58, thereby effectively creating a double-acting pump similar to that of FIG. 4. Alternatively, as illustrated in FIG. 7, the plate could serve as a wall member 96 disposed between two points along the channel 68, thereby completely blocking off the second fluid chamber 52, and thereby effectively creating a single-acting pump similar to that of FIG. 5.

Alternatively, if an increase in the concentration of compressed fluid is desired, the wall member 96 can instead be positioned to block the outlet 60, thereby effectively creating effectively creating a straight two-stage compression pump. Similarly, a controllable valve could be placed at the outlet 60 that could be set to either restrict or permit the flow of fluid out of the first chamber 50 through the outlet 60.

In certain advantageous embodiments, directional-control valves may be placed at both the passage 58 and outlet 60 to provide for the maximum amount of versatility. These valves may be part of a valve plate that is controllable either manually or automatically by an actuator, such as, for example, by an electronic control unit (not shown) that receives signals from various parts of the vehicle reflecting the compressed fluid needs of the vehicle and controls the valves accordingly. Such an actuator may, for instance, activate the sealing mechanism when the required amount of compressed fluid rises above a certain threshold value.

Because, in the above described embodiment, the compressor can be utilized to suit different conditions, the compressor may be adapted to employ a variety of optional devices appropriate for those conditions, as shown in FIG. 1. For example, the compressor may include piston bearings 98 located in the seal plate 25, which, if conditions are mild, may be sealed. However, if conditions are moderate, and a lot of pumping is required, the bearings may be open, and it may be desired to employ an oil bath or mist in the drive shaft chamber 23, along with an oil seal 99 to ensure that oil does not enter the chambers 50, 52. If conditions are at a maximum, and a large volume of highly compressed air is continually generated by the piston, a water jacket 29 may also be used to cool the air.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A multi-directional pump, comprising:
a housing having an inlet port and an outlet port;
a pumping device disposed in said housing;
a first fluid chamber in fluid communication with the inlet port that receives fluid when said pumping device is moved toward a first position;
a second fluid chamber in direct fluid communication with the outlet port;
a first conduit by which fluid in said first fluid chamber is communicated to said second fluid chamber when said pumping device is moved toward a second position; and
a second conduit by which fluid in said first fluid chamber is directly communicated to the outlet port when said pumping device is moved toward the second position while fluid in said first fluid chamber is communicated to said second chamber.

2. The pump of claim 1, wherein:
said housing includes a piston channel; and
said pumping device comprises a piston disposed in said piston channel.

3. The pump of claim 2, wherein said piston includes:
a first face at least partially defining said first fluid chamber such that said first face exerts a force on fluid in said first fluid chamber when said piston is moved toward the second position; and
a second face at least partially defining said second fluid chamber such that said second face exerts a force on fluid in said second fluid chamber when said piston is moved toward the first position.

4. The pump of claim 2, wherein said housing at least partially encloses a drive shaft chamber, further comprising an oil seal positioned between the drive shaft chamber and the piston channel to restrict the communication of oil thereto.

5. The pump of claim 1, further comprising a water jacket mountable on said housing.

6. The pump of claim 1, wherein said second fluid chamber is in direct fluid communication with the inlet port.

7. The pump of claim 1, wherein said first fluid chamber has a passage by which fluid is communicable from the inlet port to said first fluid chamber and by which fluid is communicable from said first fluid chamber to said second fluid chamber.

8. The pump of claim 1, wherein said first fluid chamber includes:
   an inlet by which fluid is communicable from the inlet port to said first fluid chamber; and
   an outlet by which fluid is communicable from said first fluid chamber to said second fluid chamber.

9. The pump of claim 1, further comprising a sealing mechanism for sealing said first conduit.

10. The pump of claim 9, further comprising an actuator for causing said sealing mechanism to seal said first conduit.

11. The pump of claim 10, wherein said actuator is configured to activate said sealing mechanism when the required amount of compressed fluid falls below a threshold value.

12. The pump of claim 11, wherein said actuator is an electronic control unit.

13. The pump of claim 9, wherein said sealing mechanism comprises a directional-control valve.

14. The pump of claim 9, wherein:
   said first fluid chamber has a passage for receiving and discharging fluid therefrom;
   said sealing mechanism is located at the passage of said first fluid chamber; and
   said first fluid chamber is in fluid communication with said second fluid chamber when said sealing mechanism is in an unactivated position.

15. The pump of claim 14, wherein said second fluid chamber is not in fluid communication with said first fluid chamber when said sealing mechanism is in a double-acting position.

16. The pump of claim 14, wherein said second fluid chamber is not in fluid communication with said first fluid chamber or the inlet port when said sealing mechanism in a single-acting position.

17. The pump of claim 9, further comprising a second sealing mechanism for sealing said second conduit.

18. The pump of claim 17, further comprising an actuator for causing said second sealing mechanism to seal said second conduit.

19. The pump of claim 18, wherein said actuator is configured to activate said second sealing mechanism when the required amount of compressed fluid rises above a threshold value.

20. The pump of claim 17, wherein:
   said first fluid chamber is in direct fluid communication with the oulet port when said second sealing mechanism is in an activated position; and
   said first fluid chamber is not in direct fluid communication with the outlet port when said second sealing mechanism is in a two-stage position.

21. The pump of claim 9, wherein said sealing mechanism comprises a wall member disposable between first and second locations along said first conduit.

22. The pump of claim 21, wherein:
   said housing includes cylinder; and
   said wall member comprises a plate mountable to said cylinder.

23. The pump of claim 1, further comprising a sealing mechanism for sealing said second conduit.

24. The pump of claim 23, further comprising an actuator for causing said sealing mechanism to seal said second conduit.

25. The pump of claim 24, wherein said actuator is configured to activate said sealing mechanism when the required amount of compressed fluid rises above a threshold value.

26. The pump of claim 23, wherein:
   said first fluid chamber is in direct fluid communication with the oulet port when said sealing mechanism is in an activated position; and
   said first fluid chamber is not in direct fluid communication with the outlet port when said sealing mechanism is in a two-stage position.

* * * * *